(12) United States Patent
Yan (10) Patent No.: US 11,987,477 B2
(45) Date of Patent: May 21, 2024

(54) SYSTEM AND METHOD FOR CONTROLLING MOBILE HOISTING APPARATUS, SERVER AND MOBILE HOISTING APPARATUS

(71) Applicant: Shanghai Tusen Weilai Artificial Intelligence Technology Co., Ltd., Shanghai (CN)

(72) Inventor: Chao Yan, Beijing (CN)

(73) Assignee: Shanghai Tusen Weilai Artificial Intelligence Technology Co., Ltd., Shanghai (CN)

( * ) Notice: Subject to any disclaimer, the term of this patent is extended or adjusted under 35 U.S.C. 154(b) by 1129 days.

(21) Appl. No.: 16/677,463

(22) Filed: Nov. 7, 2019

(65) Prior Publication Data

US 2020/0140241 A1 May 7, 2020

(30) Foreign Application Priority Data

Nov. 7, 2018 (CN) .......................... 201811320110.0

(51) Int. Cl.
*B66C 13/46* (2006.01)
*B65G 67/60* (2006.01)
*G05D 1/00* (2006.01)

(52) U.S. Cl.
CPC ............ *B66C 13/46* (2013.01); *B65G 67/603* (2013.01); *G05D 1/0274* (2013.01)

(58) Field of Classification Search
CPC ......... B66C 13/46; B66C 13/48; B66C 13/44; B66C 13/16; B65G 67/603; G05D 1/0219;
(Continued)

(56) References Cited

U.S. PATENT DOCUMENTS

2012/0255188 A1\* 10/2012 Tang ...................... B66C 13/46
33/365
2013/0096735 A1\* 4/2013 Byford .................. G05D 1/0231
701/28
(Continued)

FOREIGN PATENT DOCUMENTS

CN 101746679 A 6/2010
CN 102608351 A 7/2012
(Continued)

OTHER PUBLICATIONS

CN-208802612-U translation (Year: 2019).\*
(Continued)

*Primary Examiner* — Jason Holloway
*Assistant Examiner* — Kyle T Johnson
(74) *Attorney, Agent, or Firm* — Perkins Coie LLP (57) ABSTRACT

The present disclosure provides a system for controlling a mobile hoisting apparatus, a method for controlling a mobile hoisting apparatus, a server, and a mobile hoisting apparatus, capable of improving efficiency and reducing cost of hoisting operations. The system for controlling a mobile hoisting apparatus includes: an environment sensing module configured to detect environment information, and transmit the environment information to a server; a positioning module configured to determine a location of the mobile hoisting apparatus to obtain location information of the mobile hoisting apparatus, and transmit the location information to the server; and the server configured to plan a travel route from a current location of the mobile hoisting apparatus to a hoisting operation location of the mobile hoisting apparatus, determine a perception result based on the environment information, determine travel decision information based on the perception result and the travel route, control the mobile hoisting apparatus to move to the hoisting operation location along the travel route based on the travel (Continued)

decision information, and control, at the hoisting operation location, a hoisting arm of the mobile hoisting apparatus to place goods to be transported to a corresponding target location.

15 Claims, 3 Drawing Sheets

(58) Field of Classification Search
CPC ...... G05D 1/00; G05D 1/0246; G05D 1/0274; G01C 21/34
See application file for complete search history.

(56) References Cited

U.S. PATENT DOCUMENTS

| | | | | |
|---|---|---|---|---|
| 2013/0231779 | A1* | 9/2013 | Purkayastha | G05D 1/0088 700/258 |
| 2015/0379715 | A1* | 12/2015 | Chandrasekar | G01C 21/206 701/28 |
| 2018/0113468 | A1* | 4/2018 | Russell | G06V 20/10 |
| 2018/0244505 | A1* | 8/2018 | Guymon | B63B 27/30 |
| 2019/0134821 | A1* | 5/2019 | Patrick | B25J 9/06 |
| 2020/0140241 | A1* | 5/2020 | Yan | B66C 13/46 |
| 2021/0370509 | A1* | 12/2021 | Pivac | G05B 19/4155 |
| 2021/0387833 | A1* | 12/2021 | Harr | B66C 3/005 |
| 2022/0134547 | A1* | 5/2022 | Cristache | B25J 9/1617 700/245 |
| 2022/0363519 | A1* | 11/2022 | Avitan | B66C 13/40 |

FOREIGN PATENT DOCUMENTS

| | | | | |
|---|---|---|---|---|
| CN | 103523675 | A | | 1/2014 |
| CN | 107422730 | A | | 12/2017 |
| CN | 107577232 | A | | 1/2018 |
| CN | 208802612 | U | * | 4/2019 |
| CN | 113148879 | A | * | 7/2021 ............. B66C 13/18 |
| JP | 2014237528 | A | | 12/2014 |

OTHER PUBLICATIONS

CN-113148879-A translation (Year: 2021).*
Chinese Patent Office, 1st Office Action for CN Appl. No. 201910057722.3, dated Jun. 27, 2023, 24 pages with English translation.
Second Chinese Office Action dated Nov. 23, 2023 for Chinese Application No. 201910057722.3, 20 pages.
Chinese Patent Office, Decision of Rejection for CN Appl. No. 201910057722.3, mailed on Mar. 8, 2024, 20 pages with English translation.

* cited by examiner

SYSTEM AND METHOD FOR CONTROLLING MOBILE HOISTING APPARATUS, SERVER AND MOBILE HOISTING APPARATUS

CROSS-REFERENCE TO RELATED APPLICATION(S)

This patent document claims the benefit of priority of Chinese Patent Application No. 201811320110.0, filed Nov. 7, 2018. The entire content of the before-mentioned patent application is incorporated by reference as part of the disclosure of this application.

TECHNICAL FIELD

The present disclosure relates to the field of artificial intelligence, and more particularly, to a system for controlling a mobile hoisting apparatus, a method for controlling a mobile hoisting apparatus, a server, and a mobile hoisting apparatus.

BACKGROUND

As a hub station for waterway-land coordinated transportation, a port is a buffer for conversion of transportation schemes of containerized goods, and plays an important role in the whole container transportation process. At the port, container loading and container unloading are required for ships. The process of container unloading is generally as follows. After a ship is parked, a container is first moved onto a container truck by a gantry crane (or shore bridge). Then, the container is transported by the container truck to a yard. Finally, the container on the container truck is placed at a corresponding location in the yard by a mobile hoisting apparatus near the yard, thereby completing the container unloading operation.

Conventionally at a port, the above process requires human intervention. Taking the mobile hoisting apparatus as an example, it needs to be driven and operated by operators, resulting in a low operation efficiency. Further, due to the complicated environment at a hoisting site, it is difficult to guarantee the safety of the operators. Moreover, in order to make the mobile hoisting apparatus work continuously for 24 hours, it is necessary to provide each mobile hoisting equipment with 2 to 3 operators, which is costly.

SUMMARY

In an aspect, a system for controlling a mobile hoisting apparatus is provided according to an embodiment of the present disclosure. The system includes: an environment sensing module configured to detect environment information, and transmit the environment information to a server; a positioning module configured to determine a location of the mobile hoisting apparatus to obtain location information of the mobile hoisting apparatus, and transmit the location information to the server; and the server configured to plan a travel route from a current location of the mobile hoisting apparatus to a hoisting operation location of the mobile hoisting apparatus, determine a perception result based on the environment information, determine travel decision information based on the perception result and the travel route, control the mobile hoisting apparatus to move to the hoisting operation location along the travel route based on the travel decision information, and control, at the hoisting operation location, a hoisting arm of the mobile hoisting apparatus to place goods to be transported to a corresponding target location.

In another aspect, a mobile hoisting apparatus including the system for controlling a mobile hoisting apparatus is provided according to an embodiment of the present disclosure.

In another aspect, a server is provided according to an embodiment of the present disclosure. The server includes at least one machine executable instruction, the at least one machine executable instruction including a communication module, a navigation module, a sensing module, a decision module, and a control module. The at least one machine executable instruction is executed by a processor such that: the communication module is configured to receive environment information and location information of a mobile hoisting apparatus, the navigation module is configured to plan a travel route from a current location of the mobile hoisting apparatus to a hoisting operation location of the mobile hoisting apparatus, the sensing module is configured to determine a perception result based on the environment information, the decision module is configured to determine travel decision information based on the perception result and the travel route, and the control module is configured to control the mobile hoisting apparatus to move to the hoisting operation location along the travel route based on the travel decision information, and control, at the hoisting operation location, a hoisting arm of the mobile hoisting apparatus to place goods to be transported to a corresponding target location.

In another aspect, a server is further provided according to an embodiment of the present disclosure. The server includes at least one processor and at least one memory, the at least one memory storing at least one machine executable instruction. The at least one machine executable instruction includes the modules of the server as mentioned above.

In another aspect, a method for controlling a mobile hoisting apparatus is provided according to an embodiment of the present disclosure. The method includes: detecting environment information; determining a location of the mobile hoisting apparatus to obtain location information of the mobile hoisting apparatus; planning a travel route from a current location of the mobile hoisting apparatus to a hoisting operation location of the mobile hoisting apparatus; determining a perception result based on the environment information; determining travel decision information based on the perception result and the travel route; and controlling the mobile hoisting apparatus to move to the hoisting operation location along the travel route based on the travel decision information, and controlling, at the hoisting operation location, a hoisting arm of the mobile hoisting apparatus to place goods to be transported to a corresponding target location.

REFERENCE NUMERALS

10—System for Controlling Mobile Hoisting Apparatus; 20—Server; 30—Environment Sensing Module; 40—Positioning Module;
50—Image Capturing Apparatus; 60—Inertia Measurement Unit; 70—Inertial Navigation Module; 100—Communication Module; 200—Navigation Module; 300—Sensing Module;
400—Decision Module; 500—Control Module; 600—SLAM Module.

DETAILED DESCRIPTION OF THE EMBODIMENTS

In the following, exemplary embodiments of the present disclosure will be described in further detail with reference to the figures. While the exemplary embodiments of the present disclosure are shown in the figures, it is to be noted that the present disclosure can be implemented in various forms and are not limited to the embodiments described below. Rather, these embodiments are provided to facilitate a more thorough understanding of the present disclosure and to convey the scope of the present disclosure fully to those skilled in the art.

In order to improve the operation efficiency and reduce the cost of the hoisting, an embodiment of the present disclosure provides a mobile hoisting apparatus, a server, and a method for controlling the mobile hoisting apparatus. In order to make objects, technical solutions and advantages of the present disclosure more clear, the following examples will be further described in detail.

In a goods transportation center such as a port, there are often a large number of handling operations for goods such as containers, and a mobile hoisting apparatus, as an essential hoisting tool for handling transfer operations, frequently travel between warehouses/yards. In the related art, the mobile hoisting apparatus needs to be manually moved to an area where hoisting is to be performed, and then the hoisting of goods is carried out by operators, resulting in a low operation efficiency. Further, due to the complicated environment in the field, it is difficult to guarantee the safety of the operators.

In the embodiment of the present disclosure, the mobile hoisting apparatus can be a rubber-tired gantry crane, a shore bridge, a reach stacker, a rail-mounted gantry crane, an overhead crane, a truck crane, a forklift or the like. The mobile hoisting apparatus is provided with a hoisting arm, which can be a hoister or a mechanical arm. The present disclosure is not limited to any specific structure of the hoisting arm.

The technical solutions of the present disclosure can be applied to various application scenarios, such as a coastal port area, a highway port area, a mining area, a goods distribution center, a logistics center, a campus, and the like. The present disclosure is not limited to any specific application scenario.

Figure 1:
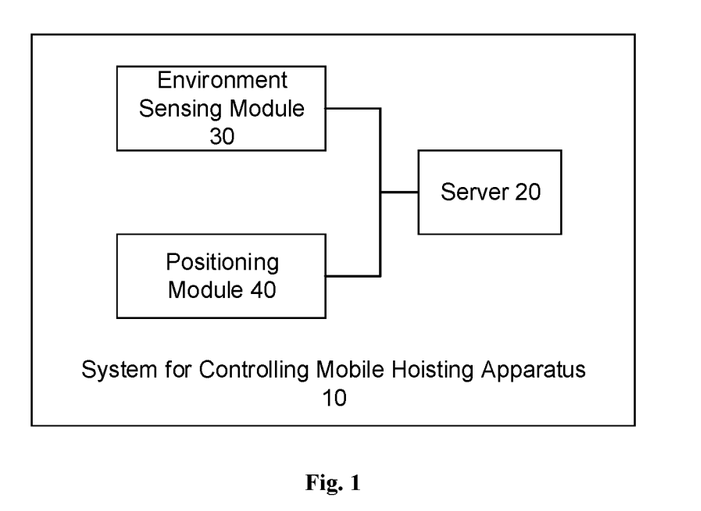
FIG. 1 is a first schematic diagram showing a structure of a system for controlling a mobile hoisting apparatus according to an embodiment of the present disclosure.

The present disclosure provides a system for controlling a mobile hoisting apparatus. Referring to FIG. 1, the system 10 for controlling a mobile hoisting apparatus includes a server 20, an environment sensing module 30, and a positioning module 40. The environment sensing module 30 and the positioning module 40 can be provided on the mobile hoisting apparatus. The server 20 can be provided on the mobile hoisting apparatus or at other locations.

The environment sensing module 30 is configured to detect environment information, and transmit the environment information to the server 20.

The environment sensing module 30 can be one or more of a laser radar, a millimeter wave radar, an ultrasonic radar, an infrared sensor, a video camera, etc., and the present disclosure is not limited thereto. Taking laser radar as an example, the environmental information collected by the laser radar is a laser point cloud. Taking the camera as an example, the environmental information collected by the camera is image data.

The positioning module 40 is configured to determine a location of the mobile hoisting apparatus to obtain location information of the mobile hoisting apparatus, and transmit the location information to the server 20.

In an embodiment of the present disclosure, the positioning module 40 can be any device having a positioning function, such as a GNSS (Global Navigation Satellite System) sensor and the like. The present disclosure is not limited to any specific model and structure of the positioning module 40.

The server 20 is configured to plan a travel route from a current location of the mobile hoisting apparatus to a hoisting operation location of the mobile hoisting apparatus, determine a perception result based on the environment information, determine travel decision information based on the perception result and the travel route, control the mobile hoisting apparatus to move to the hoisting operation location along the travel route based on the travel decision information, and control, at the hoisting operation location, a hoisting arm of the mobile hoisting apparatus to place goods to be transported to a corresponding target location.

The perception result determined by the server 20 can include information such as a type, a shape, a contour, a location, a distance and the like of an obstacle around the mobile hoisting apparatus. The server 20 can identify the environment information by using a visual processing technology such as object detection, object tracking, and semantic segmentation in the related art, so as to obtain the perception result (the present disclosure is not limited thereto).

The server 20 can invoke a navigation algorithm set by itself to plan a travel route from the current location of the mobile hoisting apparatus to the hoisting operation location, or the server 20 can invoke a third party navigation software to plan the travel route from the current location of the mobile hoisting apparatus to the hoisting operation location (the present disclosure is not limited thereto).

The travel decision information can include steering information (including information on steering angle), acceleration information (including information on an opening degree of a throttle pedal), deceleration information (including information on an opening degree of a brake pedal), gear information (including information on driving, reverse or neutral gear), and the like. The specific decision algorithm can be similar to the existing decision algorithm used in the self-driving vehicles and details thereof will be omitted here. The mobile hoisting apparatus includes a vehicle control system, which can include a steering control system, a gear control system, a throttle control system, a brake control system, and the like.

In an embodiment of the present disclosure, the environment sensing module 30 and the positioning module 40 can be connected to the server 20 by using a wired communication technology or a wireless communication technology (for example, WIFI, infrared, cellular, V2X (Vehicle to Everything) technology, etc.), and the present disclosure is not limited thereto. Preferably, since the V2X technology is more secure and reliable without relying on assistance or coverage of the network, in the embodiment of the present disclosure, the environment sensing module 30 and the positioning module 40 can communicate with the server 20 through the V2X technology, so as to improve driving safety and traffic efficiency of the mobile hoisting apparatus as well as reducing traffic congestion.

In the technical solution according to an embodiment of the present disclosure, the cooperation of the server 20, the environment sensing module 30, and the positioning module 40 can control the mobile hoisting apparatus to automatically travel from the current location to the hoisting operation location, and control, at the hoisting operation location, the hoisting arm of the mobile hoisting apparatus to moves goods to be transported to a corresponding target location. The mobile hoisting apparatus according to the embodiment of the present disclosure can achieve automatic driving and automatic loading and unloading of the goods to be transported without requiring for operators, and thus can work continuously for long time. Compared with the related art, it can not only improve the hoisting operation efficiency, but also reduce costs.

In an embodiment of the present application, when the mobile hoisting apparatus arrives at the hoisting operation location, it is needed to determine a target location of corresponding to goods to be transported. For example, when a hoisting task is unloading, a corresponding storage location (such as a location where the goods to be transported is stored; for example, the location can be a specific location in the warehouse, or a specific location in the yard) can be determined as the target location corresponding to the goods to be transported. As another example, when a hoisting task is loading, the target location corresponding to the goods to be transported is determined to be on a vehicle stopped at the corresponding loading and unloading location.

Figure 2:
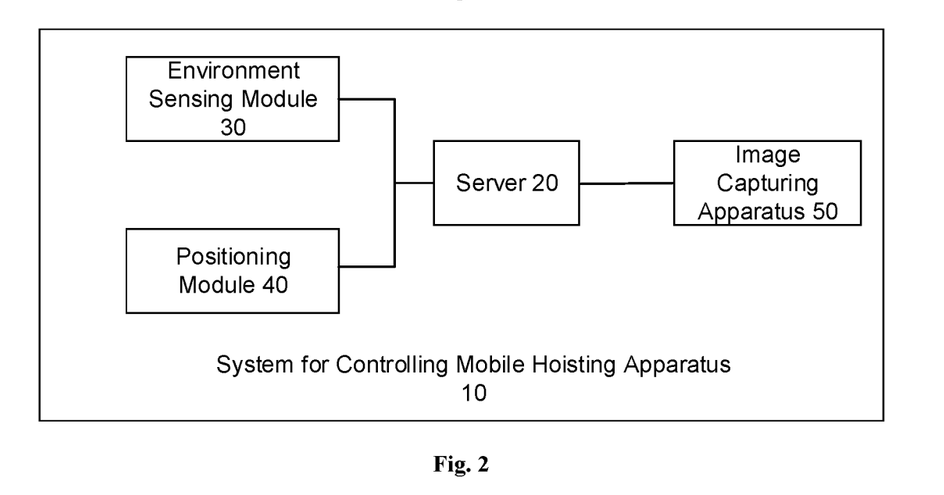
FIG. 2 is a second schematic diagram showing a structure of a system for controlling a mobile hoisting apparatus according to an embodiment of the present disclosure.

In Example 1, the system for controlling the mobile hoisting apparatus further includes an image capturing apparatus 50 (the image capturing apparatus 50 can be a camera). As shown in FIG. 2, the image capturing apparatus 50 is provided on the hoisting arm. The goods to be transported can be provided with a picture containing goods identification information.

The image capturing apparatus 50 is configured to capture a first image containing the picture, and transmit the first image to the server 20.

The server 20 is further configured to identify the first image to obtain the goods identification information, and determine the corresponding target location based on the goods identification information.

In Example 1, the picture can be a picture containing text information of the goods identification information, and the server 20 identifies the goods identification information from the first image by using an image identification algorithm. In another embodiment, the picture can also be a two-dimensional code containing the goods identification information, and the server 20 identifies the goods identification information of from the first image by using a two-dimensional code identification algorithm.

The server 20 determining the corresponding target location based on the goods identification information may include, but not limited to: determining the corresponding target location based on the goods identification information of the goods to be transported from a correspondence between pre-stored identification of goods and target locations; or transmitting to a cloud server an obtaining request containing the goods identification information, and receiving from the cloud server a target location corresponding to the goods identification information.

In Example 2, an inductive reader can be provided on the mobile hoisting apparatus. The inductive reader can be specifically provided on the hoisting arm. The goods to be transported can be provided with an electronic tag carrying goods identification information.

The inductive reader can be configured to read the goods identification information of on the electronic tag, and transmit the goods identification information to the server 20.

The server 20 can be further configured to determine the corresponding target location based on the goods identification information.

Figure 3:
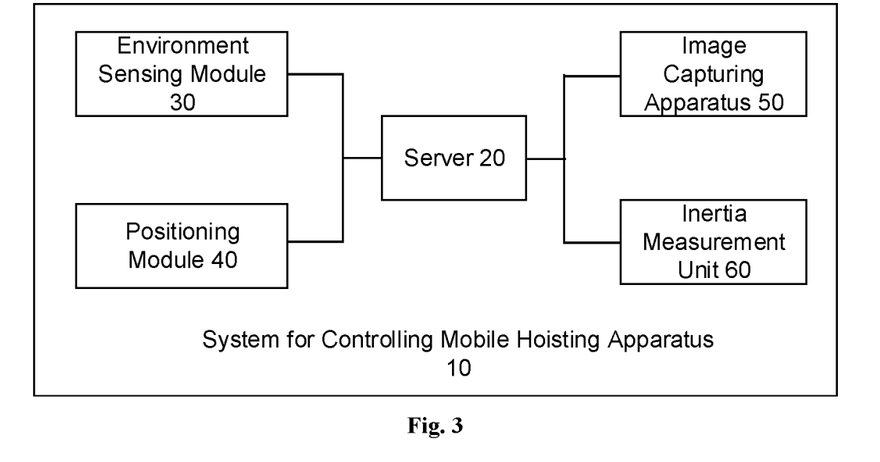
FIG. 3 is a third schematic diagram showing a structure of a system for controlling a mobile hoisting apparatus according to an embodiment of the present disclosure.

As an example, in order to allow the mobile hoisting apparatus to accurately lift goods to be transported, in an embodiment of the present disclosure, an inertial measurement unit is provided on an end effector of the hoisting arm configured to grab the goods to be transported. The inertial measurement unit reads a three-axis attitude angle and an acceleration of the end effector in real time to obtain a real-time movement gesture of the end effector, and the image capturing apparatus 50 captures a second image of a grab section provided on the goods to be transported and coordinated with the end effector to obtain orientation information of the grab section, so that the movement gesture of the end effector can be adjusted in real time in such a manner that the end effector can accurately grab the grab section to lift the goods to be transported. Thus, the mobile hoisting apparatus further includes an inertial measurement unit 60. As shown in FIG. 3, the inertial measurement unit 60 is provided on an end effector of the hoisting arm. The inertial measurement unit 60 is configured to measure a three-axis attitude angle and an acceleration of the end effector, and transmit the three-axis attitude angle and the acceleration to the server 20. The image capturing apparatus 50 is further configured to capture a second image of a grab section provided on the goods to be transported and coordinated with the end effector, and transmit the second image to the server 20. The server 20 is further configured to determine a current movement gesture of the end effector based on the three-axis attitude angle and the acceleration of the end effector, determine orientation information of the grab section based on the second image, and adjust a movement gesture of the end effector based on the orientation information of the grab section and the current movement gesture of the end effector.

In an embodiment of the present disclosure, the hoisting arm can be a hoister. A lock can be provided at each of four corners of a lower part of the hoister (i.e., the four locks constitute the end effector). The goods to be transported can be a container. A lock hole coordinated with the lock is provided at each of four corners of the top of the container (i.e., the four lock holes constitute the grab section). When the four locks of the hoister are inserted into the four lock holes on the containers, the hoister can lift the container. Of course, in some other examples, the hoisting arm can be a hoister having a hook provided at its lower part (i.e., the hook constitutes the end effector). When the goods to be transported is a container, a buckle or ring can be provided on the top of the container. When the hook of the hoister is hooked to the buckle or ring on the top of the container, the hoister can lift the container. Of course, in some other embodiments, the hoisting arm includes two mechanical arms, each of which is provided with a mechanical hand (i.e., the end effector), the goods to be transported are provided with a recessed hole/a grip (i.e., a grab section), and the goods to be transported are lifted by the two mechanical arms. The present disclosure is not limited to any specific structures of the hoisting arm and the goods to be transported.

As an example, since the positioning module 40 has a certain positioning error, in order to further obtain a precise location of the mobile hoisting apparatus, in some embodiments, the server 20 is further configured to, after the mobile hoisting apparatus arrives at the hoisting operation location, construct a high-precision map by using Simultaneous Localization and Mapping (SLAM) technology, and obtain current location information of the mobile hoisting apparatus based on the high-precision map. Since the hoisting operation location is obtained by positioning of the positioning module and the positioning module has a certain positioning error, a location at which the mobile hoisting apparatus actually arrives might not be the exact hoisting operation location. Therefore, it is needed to obtain the precise location of the mobile hoisting apparatus. The SLAM technology can enable centimeter-level positioning of the mobile hoisting apparatus, thereby improving positioning precision.

Figure 4:
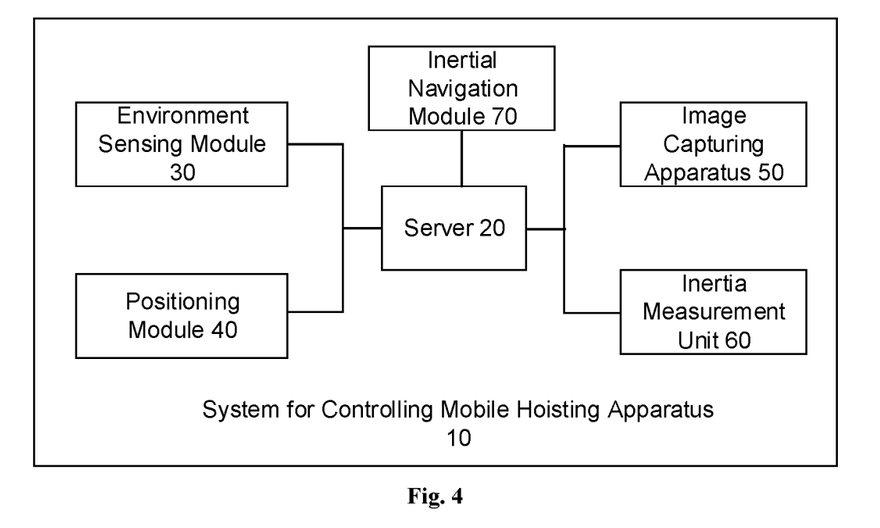
FIG. 4 is a fourth schematic diagram showing a structure of a system for controlling a mobile hoisting apparatus according to an embodiment of the present disclosure.

For example, in some areas where a positioning signal is seriously blocked, the positioning module cannot obtain the location information. Therefore, in the above embodiment, the mobile hoisting apparatus is further provided with an inertial navigation module, so as to obtain a three-axis attitude angle and an angular velocity of the mobile hoisting apparatus through the inertial navigation module. When the server can receive no more location information from the positioning module, the location of the mobile hoisting apparatus can be derived based on information output by the inertial navigation module. Therefore, in the above embodiments, the system for controlling the mobile hoisting apparatus can further include an inertial navigation module 70, as shown in FIG. 4. The inertial navigation module 70 is configured to obtain a three-axis attitude angle and an angular velocity of the mobile hoisting apparatus, and transmit the three-axis attitude angle and the angular velocity to the server 20. The server 20 is further configured to, when no more location information is available from the positioning module 40 (for example, starting a timer each time location information transmitted from the positioning module 40 is received, if no location information has been received from the positioning module 40 before the timer reaches a preset time length threshold, it is determined that no more location information is available from the positioning module 40), fuse latest location information received from the positioning module 40, the environment information, and the three-axis attitude angle and the angular velocity of the mobile hoisting apparatus by using a Kalman filter, to obtain the current location information of the mobile hoisting apparatus. The fusion can adopt the existing inertial navigation technology, and will not be described in detail herein. Of course, in some alternatives, the inertial navigation module 70 can be replaced with an inertial navigation apparatus, and the location information of the mobile hoisting apparatus can be directly output through the inertial navigation apparatus without the server 20 performing the inertial fusion processing.

Figure 5:
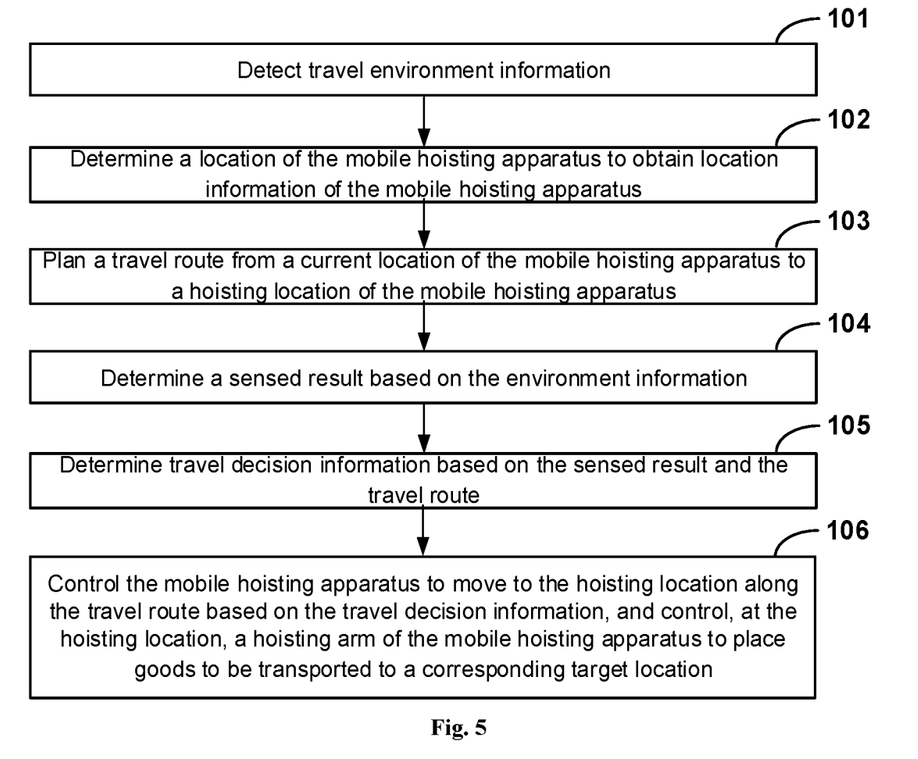
FIG. 5 is flowchart showing a method for controlling a mobile hoisting apparatus according to an embodiment of the present disclosure.

As shown in FIG. 5, based on the same application concept, an embodiment of the present disclosure provides a method for controlling a mobile hoisting apparatus. The method includes the following steps.

At step 101, environment information is detected.

At step 102, a location of the mobile hoisting apparatus is determined to obtain location information of the mobile hoisting apparatus.

At step 103, a travel route from a current location of the mobile hoisting apparatus to a hoisting operation location of the mobile hoisting apparatus is planned.

At step 104, a perception result is determined based on the environment information.

At step 105, travel decision information is determined based on the perception result and the travel route.

At step 106, the mobile hoisting apparatus is controlled to move to the hoisting operation location along the travel route based on the travel decision information, and at the hoisting operation location, a hoisting arm of the mobile hoisting apparatus is controlled to place goods to be transported to a corresponding target location.

Similarly, the technical solution according to the embodiment of the present disclosure can control the hoisting apparatus to achieve automatic driving and automatic loading and unloading of the goods to be transported without requiring for operators, and thus can work continuously for long time. Compared with the related art, it can not only improve the hoisting efficiency, but also reduce costs.

In example 1, the goods to be transported can be provided with a picture containing goods identification information, and the method can further include: capturing a first image containing the picture; and identifying the first image to obtain the goods identification information, and determining the corresponding target location based on the goods identification information.

In example 2, the goods to be transported can be provided with an electronic tag containing goods identification information, and the method can further include: reading the goods identification information on the electronic tag, which is provided on the goods to be transported and carries the goods identification information; and determining the corresponding target location based on the goods identification information.

As an example, in the above embodiments, the hoisting arm can be provided with an end effector configured to grab the goods to be transported, and the method can further include: measuring a three-axis attitude angle and an acceleration of the end effector; capturing a second image of a grab section provided on the goods to be transported, the grab section being coordinated with the end effector; determining a current movement gesture of the end effector based on the three-axis attitude angle and the acceleration of the end effector; determine orientation information of the grab section based on the second image; and adjusting a movement gesture of the end effector based on the orientation information of the grab section and the current movement gesture of the end effector.

As an example, in the above embodiments, the method can further include: after the mobile hoisting apparatus arrives at the hoisting operation location, constructing a high-precision map by using SLAM technology, and obtaining current location information of the mobile hoisting apparatus based on the high-precision map.

As an example, in the above embodiments, the method can further include: obtaining a three-axis attitude angle and an angular velocity of the mobile hoisting apparatus; and when no more location information is available from the positioning module, fuse latest location information received from the positioning module, the environment information, and the three-axis attitude angle and the angular velocity of the mobile hoisting apparatus by using a Kalman filter, to obtain the current location information of the mobile hoisting apparatus.

Figure 6:
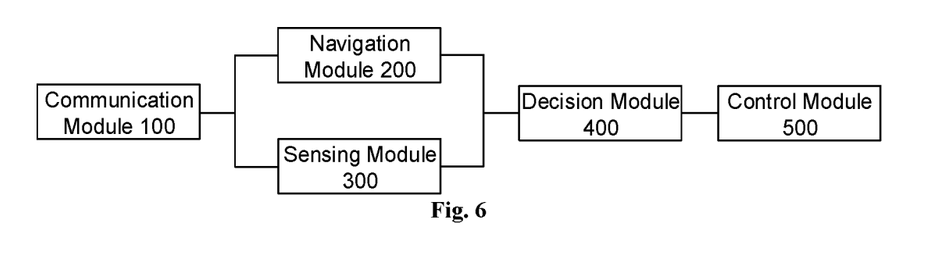
FIG. 6 is a first schematic diagram showing a structure of a server according to an embodiment of the present disclosure.

As shown in FIG. 6, based on the same application concept, an embodiment of the present disclosure provides a server. The server includes at least one machine executable instruction executable by a processor. The at least one machine executable instruction includes a communication module 100, a navigation module 200, a sensing module 300, a decision module 400, and a control module 500. In the present embodiment, the at least one machine executable instruction is executed by the processor to implement operations as follows.

The communication module 100 is configured to receive environment information and location information of a mobile hoisting apparatus. The environment information and the location information of a mobile hoisting apparatus can be detected by corresponding modules such as the environment sensing module 30 and the positioning module 40 in the above embodiments, which will not be repeated herein. The communication function of the communication module 100 can be achieved by a wired communication technology or a wireless communication technology (for example, WIFI, infrared, cellular, V2X (Vehicle to Everything) technology, etc.), and the present disclosure is not limited thereto. Since the V2X technology is more secure and reliable without relying on assistance or coverage of the network, it is preferably used in the embodiment of the present disclosure to perform communication, so as to improve driving safety and traffic efficiency of the mobile hoisting apparatus as well as reducing traffic congestion.

The navigation module 200 mainly uses a navigation algorithm to plan a travel route from the current location of the mobile hoisting apparatus to the hoisting operation location.

The sensing module 300 determines the perception result based on the environment information. In a specific implementation, the environment information can be identified by using a visual processing technology such as target detection, target tracking, and semantic segmentation, so as to obtain the perception result (the present disclosure is not limited thereto). The perception result can include information such as a type, a shape, a contour, a location, a distance and the like of an obstacle around the mobile hoisting apparatus.

The decision module 400 determines the travel decision information based on the perception result and the travel route. The determined travel decision information can include steering information (including information on steering angle), acceleration information (including information on an opening degree of a throttle pedal), deceleration information (including information on an opening degree of a brake pedal), gear information (including information on driving, reverse or neutral gear), and the like.

The control module 500 controls the mobile hoisting apparatus to move to the hoisting operation location along the travel route based on the travel decision information, and controls, at the hoisting operation location, a hoisting arm of the mobile hoisting apparatus to place goods to be transported to a corresponding target location. The hoisting arm, can be a hoister or a mechanical arm (the present disclosure is not limited thereto).

In the technical solution according to an embodiment of the present disclosure, the operations implemented by the communication module 100, the navigation module 200, the sensing module 300, the decision module 400, and the control module 500 can control the mobile hoisting apparatus to automatically travel from the current location to the hoisting operation location, and control, at the hoisting operation location, the hoisting arm of the mobile hoisting apparatus to moves goods to be transported to a corresponding target location. With the server according to the embodiment of the present disclosure, the mobile hoisting apparatus can achieve automatic driving and automatic loading and unloading of the goods to be transported without requiring for operators, and thus can work continuously for long time. Compared with the related art, it can not only improve the hoisting efficiency, but also reduce costs.

In an embodiment of the present application, when the mobile hoisting apparatus arrives at the hoisting operation location, it is needed to determine a target location of corresponding to goods to be transported. For example, when a hoisting task is unloading, a corresponding storage location can be determined as the target location corresponding to the goods to be transported. As another example, when a hoisting task is loading, the target location corresponding to the goods to be transported is determined to be on a vehicle stopped at the corresponding loading and unloading location.

In example 1, the goods to be transported can be provided with a picture containing goods identification information. The communication module 100 can be further configured to receive a first image containing a picture, and the picture contains goods identification information of the goods to be transported. The control module 500 can be further configured to identify the first image to obtain the goods identification information, and determine the corresponding target location based on the goods identification information.

In the embodiment of the present disclosure, an image capturing apparatus such as a camera can be provided on the hoisting arm, so as to capture the first image containing the picture. The picture is provided on the goods to be transported, and can be a picture containing text information of the goods identification information. Then, the control module can identify the goods identification information from the first image by using an image identification algorithm. Of course, the picture can also be a two-dimensional code or a bar code containing the goods identification information, and then the control module is needed to identify the goods identification information from the first image by using a two-dimensional code identification algorithm or a bar code identification algorithm.

It should be noted that a correspondence between goods identification information and a target location can be pre-stored in the control module 500. After identifying the first image to obtain the goods identification information, the control module 500 can determine the target location corresponding to the goods identification information of the goods to be transported based on the correspondence. In another embodiment of the present disclosure, the control module 500 can transmit to a cloud server an obtaining request containing the goods identification information, and receive from the cloud server a target location corresponding to the goods identification information.

In example 2, the goods to be transported can be provided with an electronic tag containing goods identification information, and an inductive reader can be provided on the mobile hoisting apparatus for reading the goods identification information on the electronic tag. After the inductive reader reading the goods identification information on the electronic tag, the communication module 100 can receive the goods identification information, and the control module 500 can determine the corresponding target location based on the goods identification information.

As an example, in order to allow the mobile hoisting apparatus to accurately lift goods to be transported, in an embodiment of the present disclosure, an inertial measurement unit is provided on an end effector of the hoisting arm configured to grab the goods to be transported. The inertial measurement unit reads a three-axis attitude angle and an acceleration of the end effector in real time to obtain a real-time movement gesture of the end effector, and the image capturing apparatus captures a second image of a grab section provided on the goods to be transported and coordinated with the end effector to obtain orientation information of the grab section, so that the movement gesture of the end effector can be adjusted in real time in such a manner that the end effector can accurately grab the grab section to lift the goods to be transported. Thus, the communication module 100 can be further configured to receive the three-axis attitude angle and the acceleration of the end effector, and to receive the second image of the grab section provided on the goods to be transported and coordinated with the end effector to obtain orientation information of the grab section. The control module 500 can be further configured to determine a current movement gesture of the end effector based on the three-axis attitude angle and the acceleration of the end effector, determine orientation information of the grab section based on the second image, and adjust a movement gesture of the end effector based on the orientation information of the grab section and the current movement gesture of the end effector.

Figure 7:
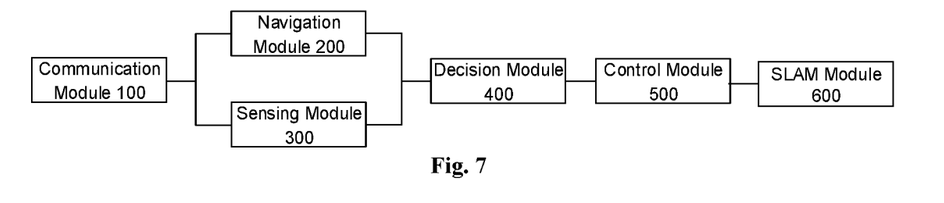
FIG. 7 is a second schematic diagram showing a structure of a server according to an embodiment of the present disclosure.

The hoisting operation location can be obtained by the positioning module in the foregoing embodiments. Since the positioning module has a certain positioning error, a location at which the mobile hoisting apparatus actually arrives might not be the exact hoisting operation location, thereby causing it difficult to carry out the lifting operation. In order to further obtain a precise location of the mobile hoisting apparatus, in an embodiment of the present disclosure, the server can further include a SLAM module 600, as shown in FIG. 7. The control module 500 can be further configured to, after the mobile hoisting apparatus arrives at the hoisting operation location, control the SLAM module to construct a high-precision map, and obtain current location information of the mobile hoisting apparatus based on the high-precision map. The SLAM technology can enable centimeter-level positioning of the mobile hoisting apparatus, thereby greatly improving positioning precision.

In some scenarios, the positioning module cannot obtain the location information due to a weak positioning signal. Therefore, in some embodiments, the mobile hoisting apparatus is further provided with an inertial navigation module, through which a three-axis attitude angle and an angular velocity of the mobile hoisting apparatus can be obtained. The location of the mobile hoisting apparatus can be derived based on information output by the inertial navigation module when the communication module cannot receive the location information of the mobile hoisting apparatus. Therefore, in the embodiment of the present application, the communication module 100 can be further configured to receive the three-axis attitude angle and the angular velocity of the mobile hoisting apparatus. The control module 500 can be further configured to, when the communication module 100 cannot receive location information of the mobile hoisting apparatus, fuse latest location information received by the communication module 100, the environment information, and the three-axis attitude angle and the angular velocity of the mobile hoisting apparatus by using a Kalman filter, to obtain the current location information of the mobile hoisting apparatus. The fusion can adopt the existing inertial navigation technology, and will not be described in detail herein. Of course, in other embodiment of the present disclosure, an inertial navigation apparatus can be installed in the mobile hoisting apparatus, and then the communication module can directly receive the location information of the mobile hoisting apparatus output through the inertial navigation apparatus without the control module performing the fusion processing.

Based on the same application concept, an embodiment of the present disclosure further provides a server. The server includes at least one processor and at least one memory. The at least one memory stores at least one machine executable instruction executable by the at least one processor. The at least one machine executable instruction includes the modules shown in FIG. 6. The at least one machine executable instruction can also provide modules for functions such as an operating system and a human-machine interaction. The at least one processor executes the at least one machine executable instruction to implement the above described operations, processes and functions of the server 20 as shown in FIG. 1.

An embodiment of the present disclosure further provides a mobile hoisting apparatus. The mobile hoisting apparatus includes the system for controlling the mobile hoisting apparatus according to any one of the above embodiments.

Unless stated otherwise specifically, terms such as processing, calculating, operating, determining, displaying and the like may refer to an action and/or procedure performed by one or more processing or computing systems or similar devices. The action and/or procedure can be represented as a data operation on a physical (e.g., electronic) quantity in a register or memory of a processing system or a conversion into other data similarly represented as a physical quantity in a memory or register of a processing system or any other similar information storage, transmission or display device. Information or signals can be represented using any of various different techniques and methods. For example, the data, instructions, commands, information, signals, bits, symbols and chips mentioned throughout the above description can be represented using voltages, currents, electromagnetic waves, magnetic fields or particles, optical fields or particles, or any combination thereof.

It should be noted that any particular order or hierarchy of the steps in the disclosed process is only an example of an exemplary method. It can be appreciated that, depending on design preferences, the particular order or hierarchy of the steps in the disclosed process can be re-arranged without departing from the scope of the present disclosure. The method claims as attached show elements of the respective steps in an exemplary order, but they are not limited to the particular order or hierarchy as described.

In the above detailed description, various features may be combined together in one single embodiment for simplicity. However, such disclosure should not be interpreted as reflecting an intent that the implementation of the claimed subject matter requires more features than those clearly defined in each claim. Rather, as reflected by the claims as attached, the present disclosure may be in a state having less than all features of the one single embodiment as disclosed. Therefore, the claims are hereby explicitly incorporated into the detailed description and each claim individually constitutes a separate preferred embodiment of the present disclosure.

It can be appreciated by those skilled in the art that various illustrative logic blocks, modules, circuits and algorithm steps described in connection with the embodiments of the present disclosure can be implemented as electronic hardware, computer software or any combination thereof. In order to clearly illustrate the interchangeability between the hardware and the software, the illustrative components, blocks, modules, circuits and steps have been described above generally with respect to their functions. Depending on specific applications and design constraints applied to the entire system, the functions can be implemented in either hardware or software. For each specific application, those skilled in the art can implement the described function flexibly. However, such implementation decision should not be interpreted as departing from the scope of the present disclosure.

The steps of the methods or algorithms described in connection with the embodiments of the present disclosure can be embodied directly as hardware, software modules executable by processors or any combination thereof. The software modules can be provided in a RAM, a flash memory, a ROM, an EPROM, an EEPROM, a register, a hard drive, a removable magnetic drive, a CD-ROM or any other form of storage medium known in the art. An exemplary storage medium is connected to a processor, such that the processor can read information from the storage medium or write information into the storage medium. Of course, the storage medium can alternatively be a component of the processor. The processor and the storage medium can be provided in an ASIC. The ASIC can be in a user terminal. Of course, the processor and the storage medium can be provided as separate components in a user terminal.

For software implementations, the technique described in the present disclosure can be implemented using modules (e.g., processes, functions or the like) performing the functions described in the present disclosure. These software codes can be stored in a memory unit and executed by a processor. The memory unit can be provided within the processor or externally to the processor. In the latter case, it can be communicatively coupled to the processor in various ways known in the art.

The above description includes examples of one or more embodiments. Of course, it would be impossible to describe all possible combinations of components or methods in order to describe the above embodiments. However, it can be appreciated by those skilled in the art that the embodiments can be further combined and arranged. Thus, the embodiments described herein are intended to cover all such changes, modifications and variants that fall within the scope of the claims as attached. Further, the term "including" as used in the description or claims has a coverage similar to that of the term "comprising" when used in the claims as a transition word. Moreover, any term "or" as used in the claims or description is to be interpreted as "or in a non-exclusive sense".

What is claimed is:

1. A system for controlling a mobile hoisting apparatus, comprising:
    an environment sensing module configured to detect environment information, and transmit the environment information to a server;
    a positioning module configured to determine a location of the mobile hoisting apparatus to obtain location information of the mobile hoisting apparatus, and transmit the location information to the server;
    the server configured to plan a travel route from a current location of the mobile hoisting apparatus to a hoisting operation location of the mobile hoisting apparatus, determine a perception result based on the environment information, determine travel decision information based on the perception result and the travel route, control the mobile hoisting apparatus to move to the hoisting operation location along the travel route based on the travel decision information, and control, at the hoisting operation location, a hoisting arm of the mobile hoisting apparatus to place goods to be transported to a corresponding target location;
    an inertial measurement unit provided on an end effector of the hoisting arm that is configured to grab the goods to be transported; and
    an image capturing apparatus provided on the hoisting arm, wherein
    the inertial measurement unit is configured to measure a three-axis attitude angle and an acceleration of the end effector, and transmit the three-axis attitude angle and the acceleration to the server,
    the image capturing apparatus is configured to capture an image of a grab section provided on the goods to be transported and coordinated with the end effector, and transmit the image to the server, and
    the server is further configured to determine a current movement gesture of the end effector based on the three-axis attitude angle and the acceleration of the end effector, determine orientation information of the grab section based on the image, and adjust a movement gesture of the end effector based on the orientation information of the grab section and the current movement gesture of the end effector.

2. The system of claim 1, wherein the image is a first image, and the goods to be transported is provided with a picture containing goods identification information,
    the image capturing apparatus is further configured to capture a second image containing the picture, and transmit the second image to the server, and
    the server is further configured to identify the second image to obtain the goods identification information, and determine the corresponding target location based on the goods identification information.

3. The system of claim 1, further comprising: an inductive reader provided on the hoisting arm, wherein the goods to be transported are provided with an electronic tag carrying goods identification information, wherein
    the inductive reader is configured to read the goods identification information on the electronic tag, and transmit the goods identification information to the server, and
    the server is further configured to determine the corresponding target location based on the goods identification information.

4. The system of claim 1, wherein the server is further configured to, after the mobile hoisting apparatus arrives at the hoisting operation location, construct a high-precision map by using Simultaneous Localization and Mapping (SLAM) technology, and obtain current location information of the mobile hoisting apparatus based on the high-precision map.

5. The system of claim 1, further comprising: an inertial navigation module configured to obtain a three-axis attitude angle and an angular velocity of the mobile hoisting apparatus, and transmit the three-axis attitude angle and the angular velocity to the server,     wherein the server is further configured to, when no more location information is available from the positioning module, fuse latest location information received from the positioning module, the environment information, and the three-axis attitude angle and the angular velocity of the mobile hoisting apparatus by using a Kalman filter, to obtain the current location information of the mobile hoisting apparatus.

6. A server, comprising:

at least one processor; and at least one non-transitory memory storing at least one machine executable instruction, the at least one machine executable instruction comprising a communication module, a navigation module, a sensing module, a decision module, and a control module, wherein the at least one machine executable instruction is executed by a processor such that:

the communication module is configured to receive environment information and location information of a mobile hoisting apparatus, the navigation module is configured to plan a travel route from a current location of the mobile hoisting apparatus to a hoisting operation location of the mobile hoisting apparatus, the sensing module is configured to determine a perception result based on the environment information, the decision module is configured to determine travel decision information based on the perception result and the travel route, and the control module is configured to control the mobile hoisting apparatus to move to the hoisting operation location along the travel route based on the travel decision information, and control, at the hoisting operation location, a hoisting arm of the mobile hoisting apparatus to place goods to be transported to a corresponding target location, wherein the communication module is further configured to receive a three-axis attitude angle and an acceleration of an end effector, and receive an image of a grab section provided on the goods to be transported and coordinated with the end effector, the end effector being provided on the hoisting arm and configured to grab the goods to be transported, and wherein the control module is further configured to determine a current movement gesture of the end effector based on the three-axis attitude angle and the acceleration of the end effector, determine orientation information of the grab section based on the image, and adjust a movement gesture of the end effector based on the orientation information of the grab section and the current movement gesture of the end effector.

7. The server of claim 6, wherein the image is a first image and the communication module is further configured to receive a second image containing a picture, the picture containing goods identification information of the goods to be transported, and     the control module is further configured to identify the second image to obtain the goods identification information, and determine the corresponding target location based on the goods identification information.

8. The server of claim 6, wherein the communication module is further configured to receive goods identification information of the goods to be transported, and     the control module is further configured to determine the corresponding target location based on the goods identification information.

9. The server of claim 6, further comprising: a Simultaneous Localization and Mapping (SLAM) module,     the control module is further configured to, after the mobile hoisting apparatus arrives at the hoisting operation location, control the SLAM module to construct a high-precision map, and obtain current location information of the mobile hoisting apparatus based on the high-precision map.

10. The server of claim 6, wherein the communication module is further configured to receive a three-axis attitude angle and an angular velocity of the mobile hoisting apparatus,     the control module is further configured to, when the communication module can receive no more location information of the mobile hoisting apparatus, fuse latest location information received by the communication module, the environment information, and the three-axis attitude angle and the angular velocity of the mobile hoisting apparatus by using a Kalman filter, to obtain the current location information of the mobile hoisting apparatus.

11. A method for controlling a mobile hoisting apparatus, comprising:

detecting environment information;

determining a location of the mobile hoisting apparatus to obtain location information of the mobile hoisting apparatus;

planning a travel route from a current location of the mobile hoisting apparatus to a hoisting operation location of the mobile hoisting apparatus;

determining a perception result based on the environment information;

determining travel decision information based on the perception result and the travel route; and     controlling the mobile hoisting apparatus to move to the hoisting operation location along the travel route based on the travel decision information, and controlling, at the hoisting operation location, a hoisting arm of the mobile hoisting apparatus to place goods to be transported to a corresponding target location, wherein the hoisting arm is provided with an end effector configured to grab the goods to be transported, and the method further comprises:

measuring a three-axis attitude angle and an acceleration of the end effector;

capturing an image of a grab section provided on the goods to be transported, the grab section being coordinated with the end effector;

determining a current movement gesture of the end effector based on the three-axis attitude angle and the acceleration of the end effector;

determine orientation information of the grab section based on the image; and     adjusting a movement gesture of the end effector based on the orientation information of the grab section and the current movement gesture of the end effector.

12. The method of claim 11, wherein the image is a first image, and the goods to be transported are provided with a picture containing goods identification information, and the method further comprises:

capturing a second image containing the picture; and identifying the second image to obtain the goods identification information, and determining the corresponding target location based on the goods identification information.

13. The method of claim 11, further comprising:
reading goods identification information on an electronic tag, the electronic tag being provided on the goods to be transported and carrying the goods identification information; and
determining the corresponding target location based on the goods identification information.

14. The method of claim 11, further comprising:
constructing, after the mobile hoisting apparatus arrives at the hoisting operation location, a high-precision map by using Simultaneous Localization and Mapping (SLAM) technology, and obtaining current location information of the mobile hoisting apparatus based on the high-precision map.

15. The method of claim 11, further comprising:
obtaining a three-axis attitude angle and an angular velocity of the mobile hoisting apparatus; and
fusing, when no more location information is available from the positioning module, latest location information received from the positioning module, the environment information, and the three-axis attitude angle and the angular velocity of the mobile hoisting apparatus by using a Kalman filter, to obtain the current location information of the mobile hoisting apparatus.

* * * * *